United States Patent Office 3,266,212
Patented August 16, 1966

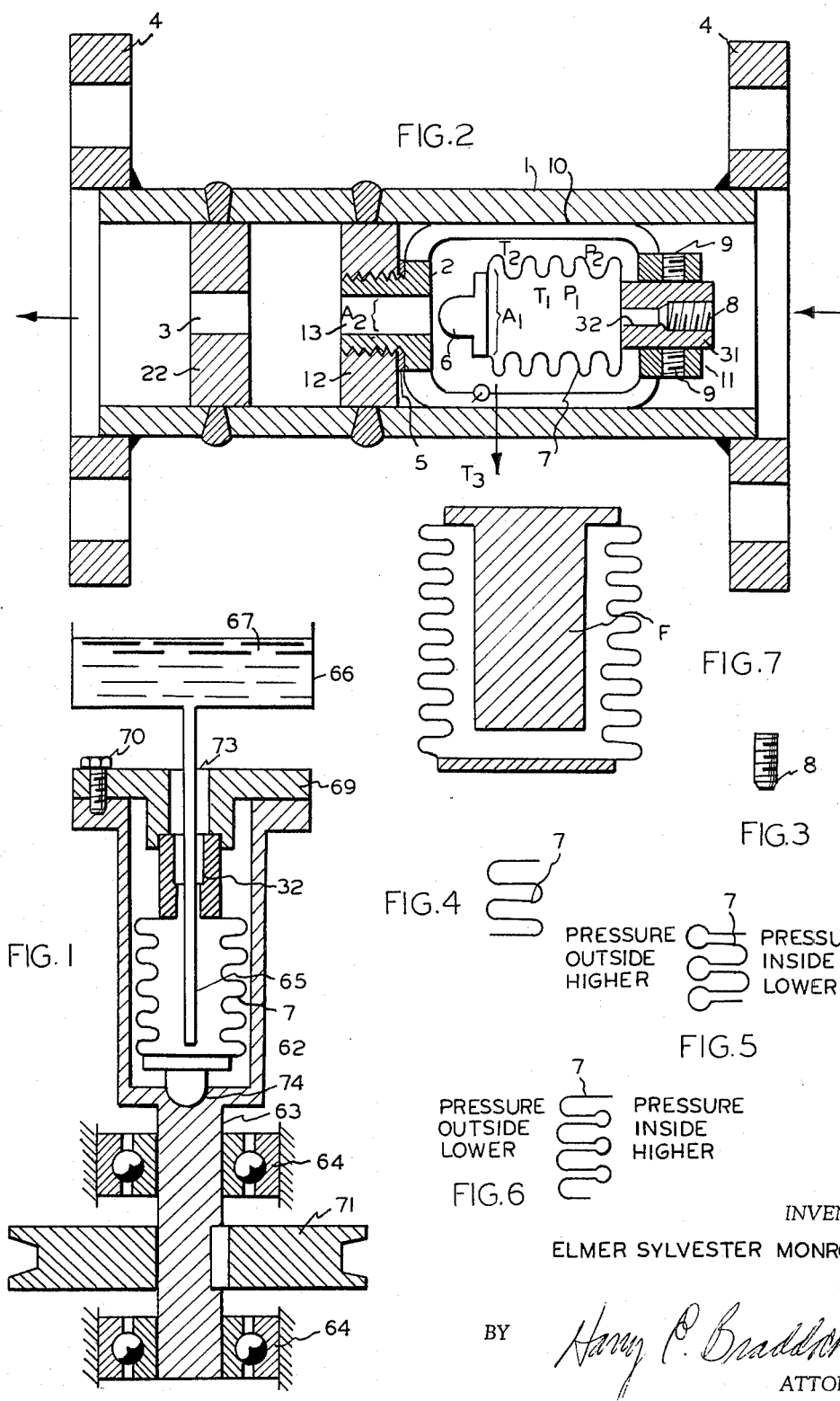

3,266,212
METHOD AND APPARATUS FOR
FILLING BELLOWS
Elmer Sylvester Monroe, Jr., Newark, Del., assignor to
E. I. du Pont de Nemours and Company, Wilmington,
Del., a corporation of Delaware
Original application Jan. 31, 1962, Ser. No. 170,091, now
Patent No. 3,146,947, dated Sept. 1, 1964. Divided
and this application Feb. 25, 1963, Ser. No. 260,704
2 Claims. (Cl. 53—22)

This application is a division of my copending application, filed January 31, 1962, now Patent No. 3,146,947.

This invention relates generally to the field of devices which separate liquids from vapors, and which separate non-condensible gases from vapors in a system involving usually a valve unit actuated by a control means which in effect senses the heat content of the medium encountered and responds thereto to actuate the valve in a desired manner.

More specifically, this invention is concerned with thermostatic steam trap assemblies having an expansible corrugated metal bellows unit associated therewith for actuating a valve element in accordance with the response of the bellows to the medium passing into the assembly.

Conventional thermostatic steam trap assemblies utilizing metallic bellows units, normally containing both liquid and gas phases, are subject to serious limitations and disadvantages in use. The bellows units currently available are somewhat fragile and are ruptured by suddenly applied pressure changes and "water hammer" conditions. These bellows units when subjected to the normally encountered pressure differentials are also susceptible to rupture around the curved reversal portions of the corrugations due to fatigue and bending beyond elastic limits of the metal in these portions (illustrated in FIGURES 5 and 6). These conditions have resulted in limiting the use of this type steam trap to low pressures less than 300 p.s.i. Other problems exist in these conventional steam trap assemblies, such as severe erosive wear on the valve orifices, and failures due to high stresses occurring in valve and valve seat elements created by the high closing forces existing at higher operating pressure. In addition, conventional installations involve somewhat complicated and bulky structures or units departing from normal in-line conduit structure.

Such known units also require calibration and adjustment after installation for consistent performance, which is not desirable since it requires interruption of the system in which the assembly is installed.

It is one object of this invention to provide a novel and improved steam trap assembly which overcomes the limitations and disadvantages of the prior art assemblies in that it possesses high reliability, long service life, and the ability to function with this reliability and long life at operating pressures of about 600 p.s.i. and above.

It is another object of this invention to provide this novel improved assembly with a simple, rugged, durable and reliable bellows unit for actuation of the assembly valve element.

It is a further object of this invention to provide a new and improved steam trap assembly having an easily removable single unit construction, which is capable of in-line installation.

It is a further object of this invention to provide a steam trap assembly as discussed above in which the valve seat element, valve element and bellows unit for actuating the valve element together form an interconnected subassembly independently removable as a unit from the steam trap assembly and capable of being calibrated and adjusted while removed from the assembly.

It is yet another object of the invention to provide a steam trap assembly having features which minimize valve and valve seat erosion and wear to further contribute to long service life of the assembly.

It is another object of this invention to provide a novel and improved arrangement for completing the fabrication of the improved bellows unit in an effective manner.

In general, the objects of this invention are achieved by a thermostatic trap assembly comprising an elongated hollow casing member, a valve element, a valve seat element, and a thermostatic bellows unit operatively connected to the valve element to actuate the valve in accordance with bellows unit action as it is exposed to differing media, said bellows unit and said elements mounted in said member for installation, and removal from said casing member as a subassembly unit, as well as for adjustment and calibration while removed, the assembly further comprising a significant flow restriction positioned in said member adjacent the downstream side of the valve and valve seat elements, and the bellows unit being completely filled with, and containing only, a suitable deaerated liquid; the complete filling of the bellows unit accomplished by an arrangement in which the unit being filled is subjected to an extreme centrifuging action during filling in such a way as to completely deaerate the bellows unit prior to sealing.

Other objects and advantages will appear from a consideration of the following specification and claims taken in conjunction with the accompanying drawings in which:

FIGURE 1 is a vertical cross-sectional view of an arrangement for filling the bellows units of this invention.

FIGURE 2 is a longitudinal cross-sectional view of a thermostatic steam trap assembly embodying features of this invention.

FIGURE 3 is a side elevation of the threaded plug used to seal the filled bellows unit shown in FIGURE 1.

FIGURES 4, 5, and 6 are schematic showings of a portion of a conventional bellows unit and its deformations under high pressure existing inside and outside the bellows unit as indicated.

FIGURE 7 is a modified bellows construction which may be used in the trap assembly of the invention.

An improved steam trap assembly embodying features of this invention is shown in FIGURE 2 of the drawings. An elongated hollow tubular section or conduit portion 1 is provided at each of its ends with flanges 4 to enable the section 1 to be coupled into a conduit. Normal flow through section 1 is shown as indicated by the large arrow. Tubular section 1 is provided with two interior transversely extending wall portions 12 and 22 with restricted passageways 13 and 3 respectively extending therethrough. A detachable subassembly unit is secured in wall portion 12 by suitable means. This subassembly comprises a valve seat element 2, a valve element 6, and a bellows unit 7 for actuating the valve element 6, all linked together or interconnected by frame structure 10. In the preferred embodiment shown in FIGURE 2, the valve seat element 2 is integrally formed in frame structure 10 which is held in the desired position by threaded engagement with wall portion 12. The valve element 6 is suitably mounted in the bellows unit 7 by brazing, welding, threaded engagement or by being integrally formed with the bellows unit. The bellows unit is provided with a stem portion 31 with a passageway 32 therethrough in communication with the interior of the bellows. A threaded plug 8 is received in threaded engagement in the outer portion of the passageway 32 to seal the bellows. Stem portion 31 is adjustably secured in position in the frame structure 10 by locking screws 9. A sealing gasket may be provided between wall portion 12 and the valve seat element 2 of frame structure 10. As can be seen from the drawings the subassembly comprising frame structure 10 and the elements connected thereto can be easily removed from the main trap assembly by unscrewing it manually or with a spanner type wrench from its threaded engagement with wall portion 12. This rearrangement permits adjustment and calibration of the subassembly before installation in an active conduit system and lends itself to a simple "in-line" installation.

Restricted passageway 3 acts to control flow through the assembly to reduce the pressure drop across valve seat 2 when in the opened position which reduces the erosion of valve seat 2 as well as of valve element 6. Since metastable flow will exist across the valve seat 2, and since subsequent flashing of the condensate into vapor will occur before passageway 3, the major pressure drop of approximately 75% will occur across passageway 3 due to choking due to the large specific volume of the vapor bubbles. In addition, this reduced pressure drop also results in a lower closing force on the seat and valve which enables use at high pressures without damage.

Bellows unit 7 is generally formed of the usual metallic tubular member having annular corrugations, which by reason of the special filling arrangement is completely solidly filled with a deaerated substantially incompressible liquid only, such that no air or gas remains in the extreme radial extremities of the annular corrugations. Air or gas located or trapped in such position in the bellows unit renders the bellows material at such positions more vulnerable to extreme working and deformations beyond its elastic limits upon subjecting the bellows to sharp pressure differentials as indicated, in exaggerated fashion, in FIGURES 5 and 6. This condition of trapped gas in the bellows corrugations greatly reduces the operating life of conventional bellows and trap assemblies.

The preferred arrangement for effectively completely filling the bellows unit with deaerated or degasified liquid is shown in FIGURE 1. As shown, a bellows unit 7 to be solidly completely filled is placed in a vertical axis rotatable receptacle 62 which is mounted on a vertical shaft 63 mounted in bearing assemblies 64. A bellows clamping and positioning element 69 is suitably secured in position by machine screws 70.

A small diameter tube 65 connected to a stationary reservoir 66 supported above the rotatable receptacle is led through passageway 32 of the bellows unit. The liquid 67, preferably deaerated or degasified, is led from the reservoir 66 through tube 65 into the bellows unit 7. The diameter of passageway 32 is sufficiently large to permit gas and/or liquid to pass out of the passageway 32 around tube 65. Just prior to and during admission of liquid to the bellows unit, the receptacle 62 and bellows 7 contained therein are rotated by a suitable drive such as pulley wheel 71 to impose a centrifugal acceleration of about several hundred gravities on the bellows and receptacle. As liquid is fed down the tube 65, the greater centrifugal force imposed on the liquid will cause it to displace all air or gas toward the center of the rotating bellows unit 7 and the rising liquid in the bellows will then displace the air out around tube 65 through passageway 32. The bellows unit is restrained against axial expansion by base 74 of the rotating receptacle 62 and by the element 69.

Lateral distortion of the bellows unit is prevented by its close fit within the receptacle 62. Liquid is supplied to the bellows unit until no air or gas remains within the unit and the reservoir portion 73 of element 69 is filled with liquid. Rotation is stopped and the tube 5 withdrawn. The supply of liquid in reservoir portion 73 insures that liquid is available to replace that displaced by the tube 5 when the tube is withdrawn. Bellows closure element 8 is threaded or otherwise secured in passageway 32 to seal the bellows unit in solidly filled condition.

The resulting bellows, filled solidly with the substantially incompressible liquid is capable of resisting any externally applied pressure or force directly by the contained liquid without the damaging distortion of the bellows corrugations. Also, no mechanical limit stops are necessary in the bellows since the liquid acts as a positive hydraulic limit stop. The absence of mechanical stops makes for a simpler, more economical design and also makes filling of the bellows easier. This bellows, substantially 100% filled with liquid, also eliminates the need for shielding the bellows unit from the impacts of moving slugs of liquid in the conduit, the solidly filled condition itself being sufficient to provide the desired protection against bellows damage.

Referring to the general showing of FIGURE 2, the operation of the trap assembly is generally as follows: The vapor pressure of the liquid within the bellows is indicated as $P_1$ and is determined by the temperature $T_1$ within the bellows. When the vapor, having a temperature $T_2$, surrounds the bellows the bellows and contained medium are heated to the same temperature so that $T_1=T_2$ and $P_1=P_2$. The pressure $P_1$ inside the bellows acts upon area $A_1$, the pressure $P_2$ outside the bellows acts upon area $A_1-A_2$ of the bellows when in the closed position. Because of the difference in the opposed effective areas, the effective of the equal pressures $P_1$ and $P_2$ will maintain the bellows in expanded condition to hold the valve element against the seat element to terminate flow. Condensation of the vapor to temperature $T_2$ in the space surrounding the bellows will not alter this condition. However, heat transfer Q to ambient surroundings at a lower temperature $T_3$ will reduce $T_2$ below $T_1$ and cause heat transfer which will lower the temperature $T_1$. Pressure $P_2$ will not change as temperature $T_2$ drops since the vapor is supplied at that pressure. But, pressure $P_1$ will decrease as temperature $T_1$ decreases since it exists in an isolated system. When $P_2(A_1-A_2)=P_1A_1$ the forces on the movable end of the bellows and the valve element will balance. Any further decrease in $T_1$ and $P_1$ causes the bellows to contract or move upwardly to the position as shown in FIGURE 2 to open the valve. This action will discharge condensate through the trap until the vapor again enters the housing to heat the bellows and close the valve.

A modified bellows unit is shown in FIGURE 7 in which a filler unit F is provided to reduce the interior liquid filled volume of the bellows so that the stored internal energy and thermal expansion of the liquid is reduced. The bellows may be designed with a volume reducing reentrant end portion as an alternative to filler unit F.

It will be seen from the preceding discussion and description that not only has an improved simplified yet effective trap assembly been provided, having prolonged life and increased pressure limits; but an advantageous method of filling the bellows unit has also been provided which contributes to the improved performance of the assembly. The advantages of the detachable subassembly unit are likewise believed to be apparent.

It is believed that numerous modifications within the spirit of this invention will occur to those skilled in the art, and all such are considered to fall within the scope of the following claims.

I claim:

1. An improved method for filling a bellows unit for a thermostatic trap assembly with an incompressible liquid, said bellows unit comprising a metallic bellows member having a longitudinally extending expansible hollow portion provided with circumferentially extending annular corrugations symmetrical to a central axis and cooperating upper and lower end closure portions, the upper one of said closure portions having an open central portion, said method comprising rotating said member in air about a vertical axis substantially perpendicular to the planes of said annular corrugations and substantially coincident with the central axis of symmetry of said corrugations at sufficiently high rotational speed to produce a centrifugal acceleration of about several hundred gravities on the member and the air within it while restraining the bellows unit against longitudinal expansion and lateral distortion and simultaneously introducing a deaerated incompressible liquid under pressure into the member adjacent said lower end closure portion through said open central portion of said upper end closure portion and permitting air to simultaneously escape through said central portion as it is separated by centrifugal action from and displaced by the introduced liquid, and sealing the member in closed condition when completely filled with the deaerated incompressible liquid.

2. An improved apparatus for filling a bellows unit for a thermostatic trap assembly with an incompressible liquid, said bellows unit comprising a metallic bellows member having a longitudinally extending expansible hollow portion provided with circumferentally extending annular corrugations symmetrical to a central axis and cooperating upper and lower end closure portions, the upper one of said closure portions having an open central portion, said apparatus comprising in combination, a rotatable assembly for rotating a bellows unit in air about a vertical axis substantially perpendicular to the planes of its annular corrugations and substantially coincident with the central axis of symmetry of said corrugations, a drive means co-operating with said rotatable assembly for rotating said assembly at a sufficiently high rotational speed to produce a centrifugal acceleration of about several hundred gravities on a bellows unit rotated by said assembly, said assembly comprising means for restraining a bellows unit, rotated thereby, against longitudinal expansion and lateral distortion, and liquid feed means cooperating with said assembly for introducing a deaerated incompressible liquid under pressure into the bellows unit adjacent its lower end closure portion through said open central portion of said upper end closure portion during its rotation and for simultaneously permitting air to escape through said open central portion as it is separated by centrifugal action from and displaced by the introduced liquid, said assembly comprising a reservoir chamber portion cooperating with the open central portion of the upper closure portion of a bellows unit in operative association with said assembly to maintain the upper level of a body of liquid filling said bellows unit at a position vertically spaced above the open central portion of said upper closure portion of said bellows unit during sealing of the unit in solidly filled condition.

References Cited by the Examiner

UNITED STATES PATENTS

| | | | |
|---|---|---|---|
| 1,218,416 | 3/1917 | Krarup | 141—34 X |
| 2,174,335 | 9/1939 | Tear | 141—34 |
| 2,934,866 | 5/1960 | Conti et al. | 53—22 |

FRANK E. BAILEY, *Primary Examiner.*

GRANVILLE Y. CUSTER, JR., P. H. POHL, *Examiners.*